United States Patent
Draaijer et al.

(10) Patent No.: US 10,033,181 B2
(45) Date of Patent: Jul. 24, 2018

(54) DC POWER DISTRIBUTION SYSTEM

(71) Applicant: PHILIPS LIGHTING HOLDING B.V., Eindhoven (NL)

(72) Inventors: Maurice Herman Johan Draaijer, Ittervoort (NL); Matthias Wendt, Würselen (DE); Michael Alex Van Hartskamp, Eindhoven (NL); Bozena Erdmann, Aachen (DE); Manuel Eduardo Alarcon-Rivero, Delft (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 655 days.

(21) Appl. No.: 14/420,939

(22) PCT Filed: Aug. 9, 2013

(86) PCT No.: PCT/IB2013/056534
§ 371 (c)(1),
(2) Date: Feb. 11, 2015

(87) PCT Pub. No.: WO2014/027291
PCT Pub. Date: Feb. 20, 2014

(65) Prior Publication Data
US 2015/0200540 A1    Jul. 16, 2015

Related U.S. Application Data

(60) Provisional application No. 61/682,819, filed on Aug. 14, 2012.

(51) Int. Cl.
*H02J 1/00* (2006.01)
*H02J 9/00* (2006.01)

(52) U.S. Cl.
CPC ............... *H02J 1/00* (2013.01); *H02J 9/005* (2013.01); *H02J 2001/008* (2013.01); *Y10T 307/406* (2015.04)

(58) Field of Classification Search
USPC ..................................................... 307/31, 126
See application file for complete search history.

(56) References Cited

U.S. PATENT DOCUMENTS

| 2010/0225240 A1 | 9/2010 | Shearer et al. |
| 2010/0325450 A1 | 12/2010 | Kendall et al. |

(Continued)

FOREIGN PATENT DOCUMENTS

| JP | 2006188229 A | 7/2006 |
| JP | 2008097475 A | 4/2008 |

(Continued)

*Primary Examiner* — Rexford Barnie
*Assistant Examiner* — Xuan Ly
(74) *Attorney, Agent, or Firm* — Akarsh P. Belagodu (57) ABSTRACT

The invention relates to a DC power distribution system for distributing DC power to one or several electrical devices. The system comprises an electrical device (2) for receiving DC power via an electrical conductor (4) from a power supply device (3) with a power supply control unit (5) and for transmitting a signal to the power supply control unit for requesting a lower power or a higher power. The power supply device is operable in a high power mode and in a low power mode, wherein the power supply control unit controls the power mode of the power supply device depending on the received signal. This allows adapting the power supply to the power, which is actually really needed in the DC power distribution system, in a technically relatively simple way. Particularly standby situations can be handled more efficiently.

20 Claims, 5 Drawing Sheets

(56) References Cited

U.S. PATENT DOCUMENTS

| | | | |
|---|---|---|---|
| 2011/0057724 A1* | 3/2011 | Pabon | H02M 7/219 327/581 |
| 2011/0128153 A1 | 6/2011 | Sims et al. | |
| 2011/0181401 A1* | 7/2011 | Walley | H02J 1/14 340/13.23 |
| 2012/0026532 A1 | 2/2012 | Arimoto | |
| 2012/0139477 A1 | 6/2012 | Oglesbee et al. | |

FOREIGN PATENT DOCUMENTS

| | | |
|---|---|---|
| WO | 2011079912 A2 | 7/2011 |
| WO | 2013038339 A1 | 3/2013 |
| WO | 2013093814 A2 | 6/2013 |
| WO | 2013093875 A1 | 6/2013 |
| WO | 2013098722 A1 | 7/2013 |
| WO | 2013098744 A2 | 7/2013 |
| WO | 2013124779 A1 | 8/2013 |

* cited by examiner

DC POWER DISTRIBUTION SYSTEM

CROSS-REFERENCE TO PRIOR APPLICATIONS

This application is the U.S. National Phase application under 35 U.S.C. § 371 of International Application No. PCT/IB13/056534, filed on Aug. 9, 2013, which claims the benefit of U.S. Provisional Patent Application No. 61/682,819, filed on Aug. 14, 2012. These applications are hereby incorporated by reference herein.

FIELD OF THE INVENTION

The invention relates to a direct current (DC) power distribution system and a DC power distribution method for distributing DC power to electrical devices. The invention relates further to an electrical device and a power supply device for being used in a DC power distribution system.

BACKGROUND OF THE INVENTION

A DC power distribution system is defined by, for instance, the EMerge standard. Currently, in a DC power distribution system in accordance with the EMerge standard power bars are always powered at a nominal voltage, even if there is only a very small fraction of load compared to nominal load conditions. Thus, even if electrical devices connected to the power bars are able to manage a standby mode, in which only very little power is consumed by the electrical devices, a power supply device of the DC power distribution system supplies the nominal voltage such that the power supply device is operated in an unfavorable point of operation, at which the efficiency of power supply is very low, for example, below ten percent.

SUMMARY OF THE INVENTION

It is an object of the present invention to provide a DC power distribution system and a DC power distribution method for distributing DC power to electrical devices, wherein the efficiency of supplying power to the electrical devices can be improved. It is a further object of the present invention to provide an electrical device and a power supply device, which can be used in the DC power distribution system such that the efficiency of supplying power can be improved.

In a first aspect of the present invention a DC power distribution system for distributing DC power to one or several electrical devices is presented, wherein the DC power distribution system comprises:

an electrical conductor for conducting DC power from a power supply device to an electrical device, the electrical device for receiving DC power from the electrical conductor and for transmitting a signal to a power supply control unit for requesting a lower power or a higher power, the power supply device for supplying DC power to the electrical device via the electrical conductor, wherein the power supply device is operable in a high power mode, in which the higher power is supplied to the electrical device via the electrical conductor, and in a low power mode, in which the lower power is supplied to the electrical device, wherein the power supply device comprises the power supply control unit for receiving the signal from the electrical device and for controlling the power mode of the power supply device depending on the received signal.

Since the power supply control unit controls the power mode of the power supply device depending on the received signal, the power supply can be adapted to the power, which is actually really needed in the DC power distribution system. For instance, if the electrical device requests higher power by using the signal, the power supply control unit can control the power supply device such that the higher power is supplied to the electrical conductor, and, if the electrical device does not request the higher power, the power supply control unit can control the power supply device such that the lower power is supplied to the electrical conductor. This adaptation of the supplied power to the actually needed power in the DC power distribution system can improve the efficiency of supplying power.

The electrical device and the power supply control unit are preferentially adapted to transmit an electrical signal as the signal from the electrical load to the power supply control unit via the electrical conductor, which is also used for supplying the power. This allows providing the adaptivity of the DC power distribution system in a technically relatively simply way.

The electrical conductor can be regarded as being a power bar of the DC power distribution system. The electrical conductor may comprise two wires for distributing the provided power and for transmitting the electrical signal.

The DC power distribution system can comprise one or more of the electrical devices. The electrical device can be, for instance, a lighting device like a lamp, a sensor like a presence sensor for detecting persons in a room, a loud speaker, et cetera. The power supply device comprises preferentially a power converter for converting alternating current (AC) power to the respective DC power. The DC power distribution system can be installed, for instance, in a building, in particular, at a ceiling of a room for, for example, illuminating the room, if at least some of the electrical devices are lamps. The DC power distribution system can therefore be a lighting system of a building.

It is preferred that the higher power is a nominal power of the DC power distribution system and the lower power is standby power of the DC power distribution system. The power supply device can be output voltage controlled, wherein for supplying the nominal power a nominal voltage of, for instance, 24 V and for supplying the standby power a standby power of, for example, 5 V can be provided. The standby voltage is sufficient, if the DC power distribution system is in a standby situation, in which power is substantially not consumed. The DC power distribution system can therefore be adapted to handle standby situations, in which no substantial load may be present, with improved power supply efficiency.

The power supply device comprises preferentially a high power supply for supplying the higher power to the electrical conductor and a low power supply for supplying the lower power to the electrical conductor, wherein the power supply control unit is adapted to control the high power supply and the low power supply depending on the received electrical signal. Thus, in an embodiment the switchability of the supplied power can be provided by using different power supplies.

The electrical device is preferentially adapted to request the power supply device to supply the higher power by transmitting the signal to the power supply control unit, wherein the power supply control unit is adapted to control the power supply device to be operated in the high power mode, if the power supply control unit receives the signal.

Correspondingly, the power supply control unit can be adapted to control the power supply device to be operated in the low power mode, if the power supply control unit is not receiving the signal for requesting the higher power, in particular, if the power supply control unit is not receiving the signal for requesting the higher power within a predetermined receiving time. Moreover, the DC power distribution system preferentially comprises several electrical devices for receiving DC power from the electrical conductor, which are adapted to request the power supply device to supply the higher power by transmitting the signal to the power supply control unit, wherein the power supply control unit is adapted to control the power supply device to be operated in the high power mode, if the power supply control unit receives any signal from the electrical devices requesting the higher power. Furthermore, the power supply control unit can be adapted to control the power supply device to be operated in the low power mode, if the power supply control unit is not receiving any signal for requesting the higher power from the electrical devices. Thus, the power supply may be controlled in a technically relatively simply way, wherein the higher power is supplied, if at least one electrical device transmits a signal requesting the higher power, which may be regarded as being a heartbeat signal, and wherein the lower power is supplied, if the power supply control unit does not receive any electrical signal at a time or within a predetermined receiving time interval.

The electrical device is preferentially operable in a low power mode, in which the electrical device consumes less power, and in a high power mode, in which the electrical device consumes more power, wherein the electrical device is adapted to switch from the low power mode to the high power mode, when the power supply device supplies the higher power, after the signal has been transmitted to the power supply control unit. In particular, the electrical device can be adapted to sense whether the higher power is supplied by the power supply device, after the signal has been transmitted to the power supply control unit, and to switch from the low power mode to the high power mode, if it has been sensed that the higher power is supplied by the power supply device. The electrical device can also be adapted to wait a predetermined waiting time before switching from the low power mode to the high power mode, after the signal has been transmitted to the power supply control unit. Thus, the electrical device can be operated substantially autonomously from the power supply device, wherein, for instance, the electrical device can provide the signal requesting higher power to the electrical conductor and switch to the high power mode, after a high power supply has been sensed and/or after the electrical device has waited a predetermined waiting time of, for instance, 30 seconds.

The low power mode of the electrical device is preferentially a standby mode of the electrical device and the high power mode of the electrical device is preferentially an active mode of the electrical device, in which the electrical device may be full operational.

The power supply device may comprise the high power supply for supplying the higher power to the electrical conductor and the low power supply for supplying the lower power to the electrical conductor, wherein the power supply control unit can be adapted to control the high power supply and the low power supply such that either the high power supply supplies the higher power or the low power supply supplies the lower power depending on the received signal. Thus, for instance, in a standby situation the high power supply may be switched off, while the low power supply may supply standby voltage to the electrical conductor. The power supply may therefore efficiently be controlled in a relatively simple way by just allowing either the high power supply or the low power supply to supply the respective voltage to the electrical conductor.

In a preferred embodiment the electrical device comprises an electrical device control unit for controlling the operational state of the electrical device and for controlling the transmission of the signal to the power supply control unit via the electrical conductor depending on the actual operational state of the electrical device and/or the desired operational state of the electrical device, to which the electrical device should be switched. The electrical device control unit can comprise two switches, one for switching on and off the electrical device and the other one for superponating an electrical signal on the electrical conductor for requesting a desired power to be supplied, wherein the switches may be controlled by, for instance, a microcontroller of the electrical device control unit. The electrical signal is preferentially not functional for the DC power distribution, but for signaling purposes only. It may be a radio frequency (RF) signal, a sine wave signal, an orthogonal frequency-division multiplexing (OFDM) signal or another electrical signal.

The DC power distribution system may comprise several electrical devices being adapted such that different electrical devices provide different signals depending on the operational state of the respective electrical device and being indicative of the identity of the respective electrical device, wherein the power supply control unit is adapted to control the power mode of the power supply device depending on the received signals from the several electrical devices. In particular, each electrical device may transmit its own unique signal, wherein the power supply control unit is preferentially adapted to distinguish between the different electrical devices based on the different received signals such that the power supply control unit can determine the operational states of the different electrical devices from the signals, wherein the power supply control unit can control the high power supply and the low power supply based on this operational state information. Since this allows the power supply control unit to reliably determine the overall power consumption situation within the DC power distribution system very accurately, the power supply provided by the DC power distribution system can be adapted to the actual power consumption situation with further improved efficiency. The power supply control unit may be equipped with a frequency selector, a mixer and a band pass filter, which are applied to the received signals, for distinguishing between the different electrical devices.

The high power supply and the low power supply are preferentially integrated in the power supply device. This allows providing the adaptive functionality of the DC power distribution system in a relatively simple way, because an installer just needs to electrically connect the power supply device to the electrical conductor, in order to equip the DC power distribution system with the high power supply, the low power supply and the power supply control unit.

In a further aspect of the present invention an electrical device for receiving DC power from an electrical conductor of a DC power distribution system is presented, wherein the electrical device is adapted to transmit a signal to the power supply control unit of the DC power distribution system for requesting a lower power or a higher power, in order to allow the power supply control unit to control the power mode of the power supply device depending on the received signal.

In a further aspect of the present invention a power supply device for supplying DC power to a DC power distribution system is presented, wherein the power supply device is operable in a high power mode, in which the higher power is supplied to the electrical device via the electrical conductor, and in a low power mode, in which the lower power is supplied to the electrical device, wherein the power supply device comprises a power supply control unit for receiving the signal from the electrical device and for controlling the power mode of the power supply device depending on the received signal.

In a further aspect of the present invention a DC power distribution method for distributing DC power to one or several electrical devices is presented, wherein the DC power distribution method comprises:

transmitting a signal from an electrical device to a power supply control unit for requesting a lower power or a higher power, receiving the signal from the electrical device and controlling a power mode of a power supply device depending on the received electrical signal by the power supply control unit, wherein the power supply device supplies DC power to the electrical device via the electrical conductor and wherein the power supply device is operable in a high power mode, in which a higher power is supplied to the electrical device via the electrical conductor, and in a low power mode, in which a lower power is supplied to the electrical device.

It shall be understood that the DC power distribution system of claim 1, the electrical device of claim 13, the power supply device of claim 14 and the DC power distribution method of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
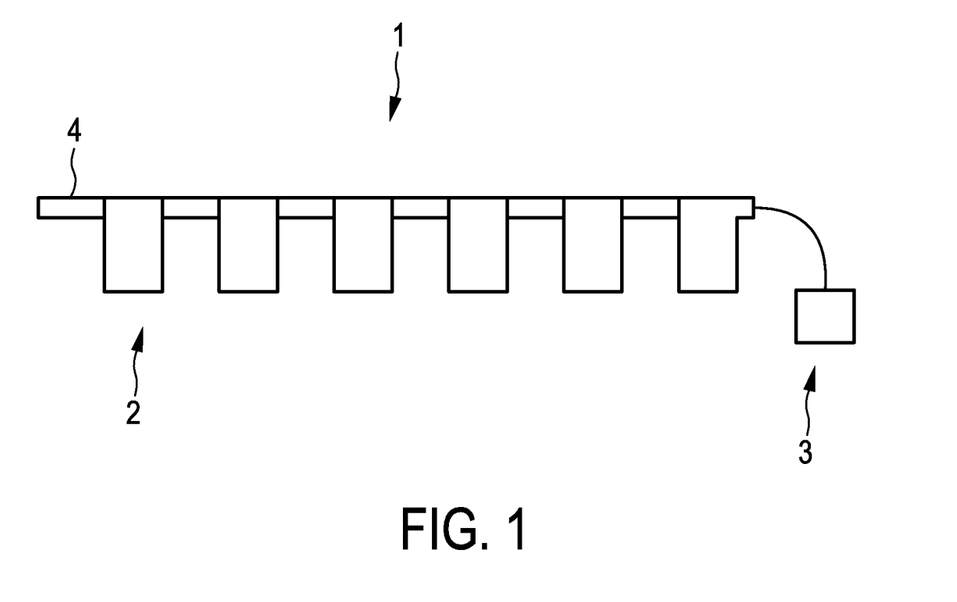
FIG. 1 shows schematically and exemplarily an embodiment of a DC power distribution system for distributing DC power to one or several electrical devices.

FIG. 1 shows schematically and exemplarily an embodiment of a DC power distribution system 1 for distributing DC power to several electrical devices 2. The electrical devices 2 are attached to an electrical conductor 4 of the DC power distribution system 1. The electrical conductor 4 is a power bar, wherein the DC power distribution system 1 further comprises a power supply device 3, which is electrically connected to the power bar 4, for providing the DC power to the power bar 4. The power bar 4 with the electrical devices 2 may be arranged at a ceiling of a room and the electrical devices 2 may be lamps such that the DC power distribution system can be a lighting system for illuminating a room.

Figure 2:
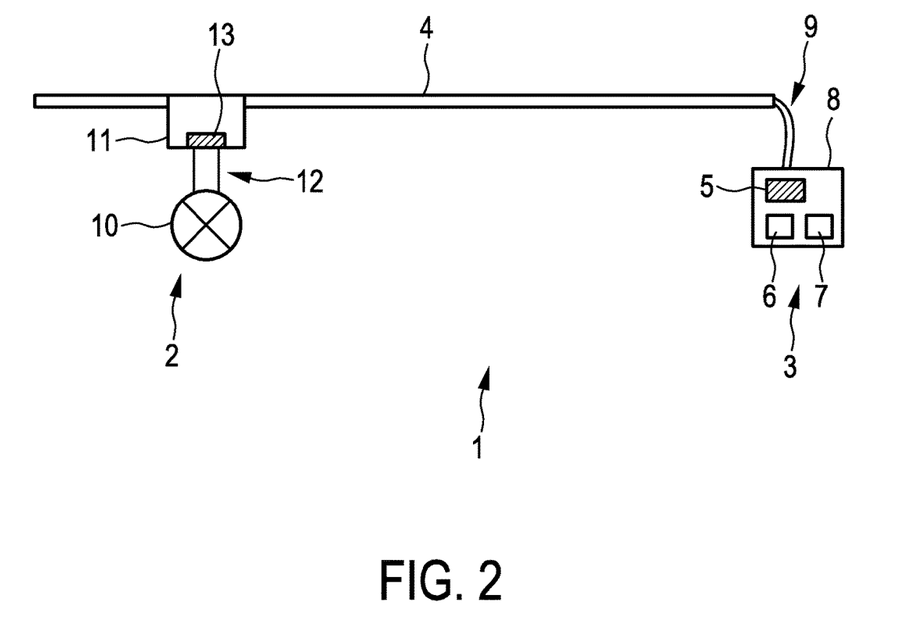
FIG. 2 shows schematically and exemplarily some elements of the DC power distribution system in more detail.

FIG. 2 shows schematically and exemplarily elements of the DC power distribution system 1 in more detail, wherein for clarity reasons only a single one of the electrical devices 2 is exemplarily shown. The electrical device 2 comprises an attaching element 11 for attaching the lamp 2 to the power bar 4, an electrical device control unit 13 for controlling the operational state of the electrical device 2 and for controlling a transmission of an electrical signal for requesting a desired power to be supplied to the power supply device 3 via the power bar 4 and at least one light source 10 for emitting light, wherein the at least one light source 10 is electrically connected to the power bar 4 via electrical connections, in particular, wires, 12, the attaching element 11 and the electrical device control unit 13. It should be noted that FIG. 2 illustrates the electrical device 2 only schematically and that, for instance, some or all of the at least one light source 10, the electrical connections 12, the electrical device control unit 13 and the attaching element 11 may be integrated in a same housing such that not all of these elements are freely accessible and visible from the outside. Instead of using wires there could also be a direct contact between the at least one light source 10 and the electrical device control unit 13.

The power bar 4 comprises two or more electrical wires, wherein the attaching element 11, which can also be regarded as being a bar connector, is preferentially adapted such that, if the attaching element 11 is attached to the power bar 4, the electrical device control unit 13 and/or the at least one light source 10 can receive power from the wires of the power bar 4. The attaching element 11 can comprise screws, a clicking arrangement or another attaching mechanism for attaching the electrical device 2 to the power bar 4.

Figure 3:
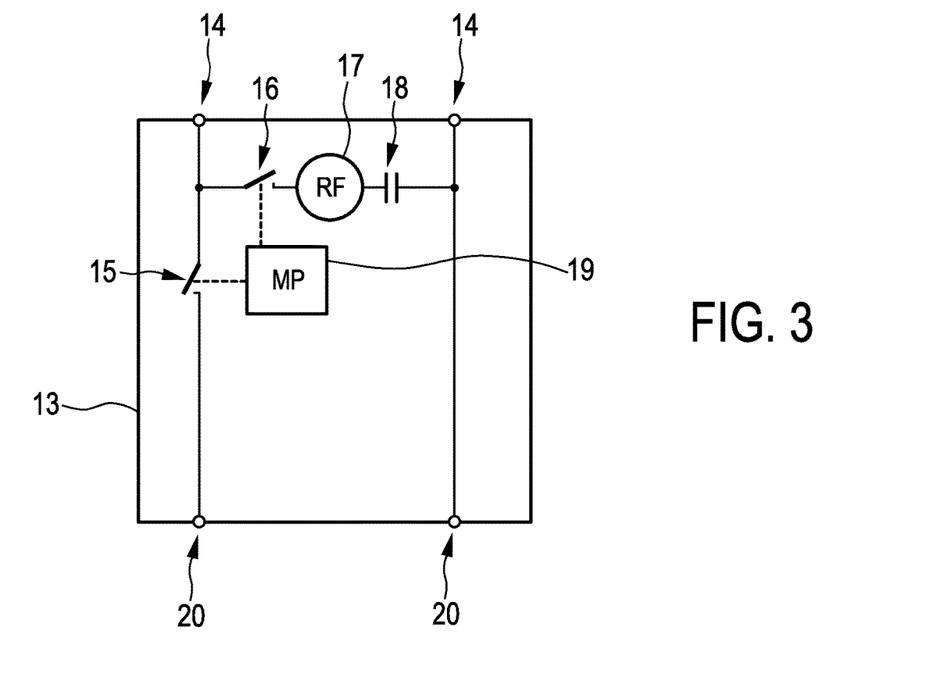
FIG. 3 shows schematically and exemplarily an embodiment of an electrical device control unit.

As schematically and exemplarily shown in more detail in FIG. 3, the electrical device control unit 13 comprises a first switch 15 and a second switch 16, which are controlled by a microprocessor 19. The electrical device control unit 13 further comprises an electrical signal generator 17, a capacitor 18, electrical connectors 14 being electrically connected to the wires of the power bar 4, if the electrical device 2 is attached to the power bar 4 via the attaching element 11, and electrical connectors 20 connected to the at least one light source 10 via the wires 12. The electrical signal generator 17 can be adapted to provide a heart beat signal, which may be an RF signal, a sine wave signal, an OFDM signal or another electrical signal, which is transmitted to the power supply device 3 via the wires of the power bar 4, if the second switch 16 is closed. In this embodiment, the microprocessor 19 is adapted to control the switches 15, 16 such that the heart beat signal is transmitted, if the first switch 15 is closed and the at least one light source 10 receives power from the power bar 4. Thus, in this embodiment the electrical device control unit 13 is adapted to transmit the heart beat signal, if the electrical device 2 is in an active mode, and to not provide the heart beat signal, if the first switch 15 is open and the electrical device 2 is in a standby mode. Moreover, if the electrical device 2 is in the standby mode and should be switched into the active mode, the heart beat signal is provided and, if the power supply device 3 supplies the nominal power after having received the heart beat signal, the electrical device 2 can be switched to the active mode.

The electrical device 2 is adapted such that the electrical signal transmitted to the power supply device 3 via the power bar 4 is not functional for the DC power distribution, but for signaling purposes only.

The power supply device 3 is operable in a high power mode, in which the higher power is supplied to the electrical devices 2 via the power bar 4, and in a low power mode, in which the lower power is supplied to the electrical devices 2. The power supply device 3 comprises a power supply control unit 5 for receiving the electrical signals from the electrical devices 2, which are used for requesting the higher power if needed, and for controlling the power mode of the power supply device 3 depending on the received electrical signal. In this embodiment the power supply device 3 comprises a high power supply 6 for supplying the higher power to the power bar 4 and a low power supply 7 for supplying the lower power to the power bar 4, wherein the power supply control unit 5 is adapted to control the high power supply 6 and the low power supply 7 depending on the received electrical signal. The high power supply 6 and the low power supply 7 are preferentially output voltage controlled such that the high power supply 6 preferentially supplies a first DC voltage being the nominal voltage of the DC power distribution system of, for instance, 24 V and the low power supply 7 supplies a second DC voltage being the standby voltage of the DC power distribution system of, for example, 5 V.

The standby voltage is sufficient, if the DC power distribution system 1 is in a standby situation, in which power is substantially not consumed. The power supply control unit 5, the first power supply 6 and the second power supply 7 are integrated in a housing 8 of the power supply device 3. The power supply device 3 is electrically connected to the power bar 4 via electrical connections 9, in particular, via electrical wires 9.

The power supply control unit 5 receives the heart beat signals from the electrical devices 2, if the respective electrical device is an active mode and not in a standby mode. The power supply control unit 5 is preferentially adapted such that the second DC voltage is supplied to the power bar 4, if all electrical devices 2 are in the standby mode, i.e. if no heart beat signal is received, and to supply the higher first DC voltage, if at least one heart beat signal is received by the power supply control unit 5.

Figure 4:
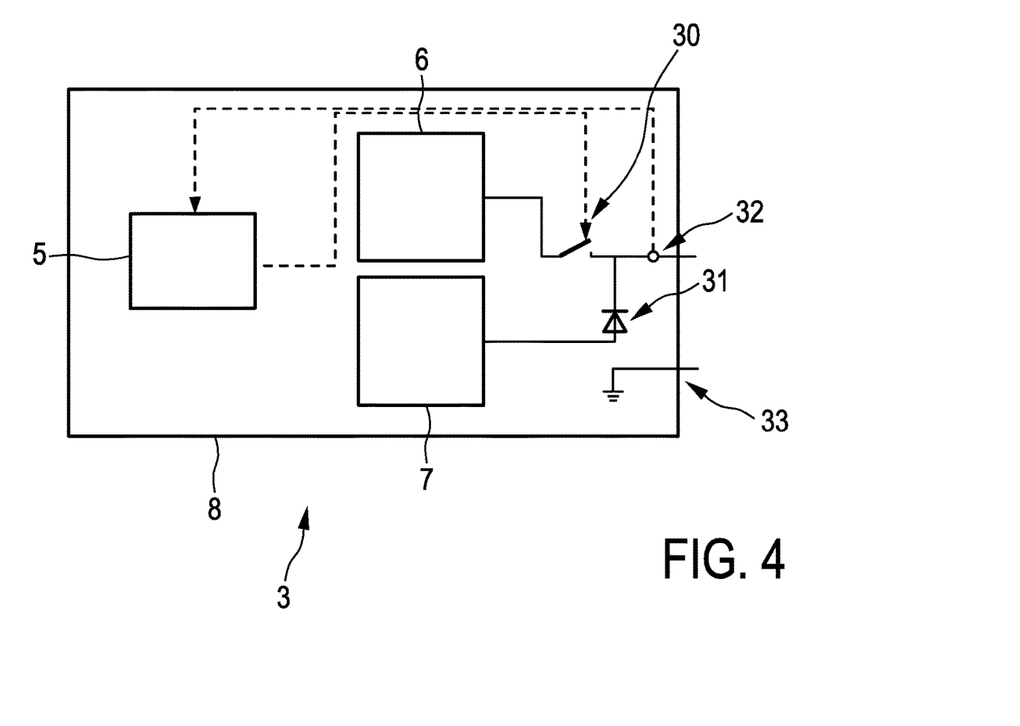
FIG. 4 shows schematically and exemplarily an embodiment of a power supply device.

The power supply device 3 can also be implemented as schematically and exemplarily shown in FIG. 4. The power supply control unit 5, which can also be regarded as being a standby management unit, may use a coupler 32 like a filter capacitor with a bandpass filter to extract the electrical signal from the power bar 4, which may be a high frequency heart beat signal. If a heart beat signal of at least one electrical device 2 is detected, the power supply control unit 5 can close the switch 30 such that the high power supply 6 can supply the higher power to the power bar 4. If a heart beat signal is not detected, in particular, not detected within a predetermined receiving time interval, the power supply control unit 5 can open the switch 30 such that only the lower power provided by the low power supply 7 is supplied via a diode 31. In FIG. 4 the connection 33 schematically and exemplarily indicates a ground connection, in particular a ground wire.

The respective electrical device 2 is operable in the standby mode, in which the electrical device 2 consumes less power, and in an active or full operational mode, in which the electrical device 2 consumes more power, wherein the electrical device 2 is adapted to switch from the standby mode to the active mode, when the power supply device 3 supplies the nominal power, after the electrical signal has been transmitted to the power supply control unit 5. In particular, the respective electrical device 2 can be adapted to sense whether the nominal voltage is supplied by the power supply device 3, after the electrical signal has been transmitted to the power supply control unit, and to switch from the standby mode to the active mode, if it has been sensed that the nominal voltage is supplied by the power supply device 3. Alternatively or in addition, the respective electrical device 2 can be adapted to wait a predetermined waiting time before switching from the standby mode to the active mode, after the electrical signal requesting the nominal voltage has been transmitted to the power supply control unit 5.

In a further embodiment the several electrical devices of the DC power distribution system can be adapted such that different electrical devices provide different electrical signals depending on the operational state of the respective electrical device, wherein the electrical signals are also indicative of the identity of the respective electrical device. In particular, the respective electrical signal can be unique for the respective electrical device. The power supply control unit can then be adapted to control the power mode of the power supply device depending on the received electrical signals from the several electrical devices.

Figure 5:
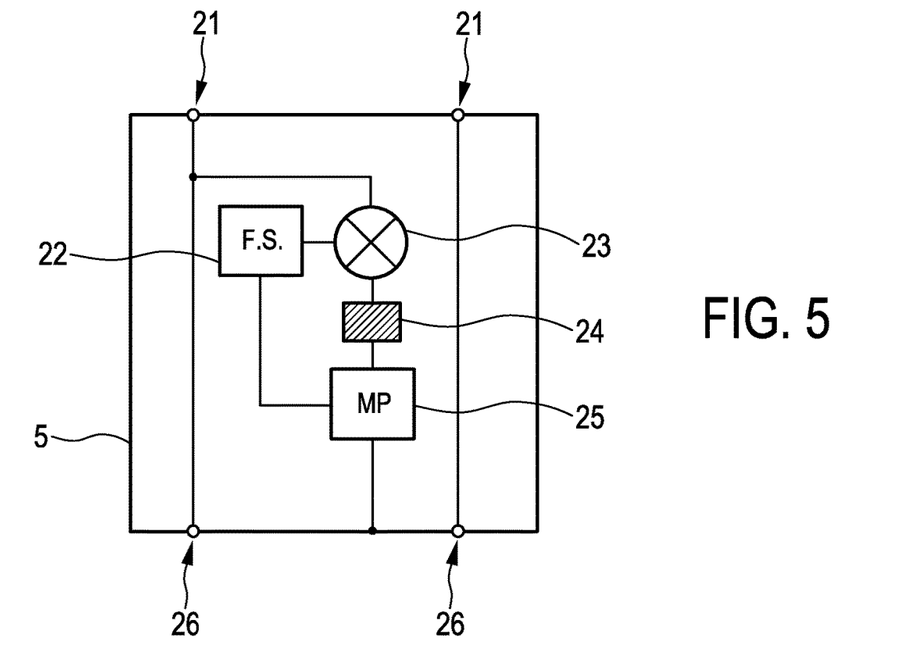
FIG. 5 shows schematically and exemplarily an embodiment of a power supply control unit.

If the power supply control unit is adapted to distinguish between different electrical devices based on different received electrical signals such that the power supply control unit can determine the operational states of the different electrical devices from the electrical signals, wherein the power supply control unit can control the high power supply and the low power supply based on this operational state information, the power supply control unit 5 may be configured as schematically and exemplarily shown in FIG. 5.

The power supply control unit 5 may comprise a frequency selector 22, a mixer 23, a bandpass filter 24 and a microprocessor 25 electrically connected within the power supply control unit 5 as shown in FIG. 5. The power supply control unit 5 may further comprise first electrical connectors 21 for being connected to two electrical wires of the power bar 4 and second electrical connectors 26 for being connected to the first and second power supplies 6, 7. The frequency selector 22 is controlled by the microprocessor 25 such that the frequency selector 22 is adjustable by the microprocessor 25, in order to detect the respective electrical signal with the respective frequency, which is unique for the respective operational state and the respective electrical device, by using the frequency selector 22, the mixer 23, the bandpass filter 24 and the microprocessor 25. In the embodiment of the power supply control unit 5 shown in FIG. 5 it is assumed that the respective electrical signal is a sine wave. In other embodiments, the electrical signal can also be another kind of signal and, accordingly, the power supply control unit can be configured to detect the respective electrical signal of the other kind.

Figure 6:
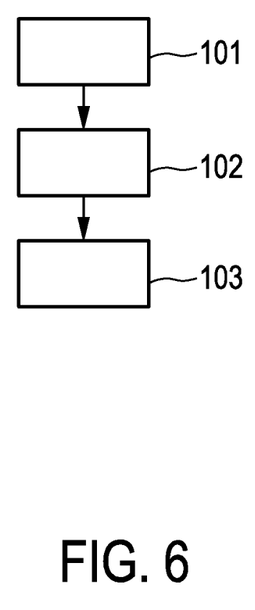
FIG. 6 shows a flowchart exemplarily illustrating an embodiment of a DC power distribution method for distributing DC power to one or several electrical devices.

In the following an embodiment of a DC power distribution method for distributing DC power to one or several electrical devices will exemplarily be described with reference to a flowchart shown in FIG. 6.

In step 101 an electrical signal is transmitted from an electrical device to a power supply control unit of a DC power distribution system for requesting a higher power. In particular, the electrical device may be in a standby mode and a power supply device of the DC power distribution system may supply a standby power to the electrical device via an electrical conductor of the DC power distribution system. If the electrical device is to be switched into an active mode, which may be a full operational mode, in which a nominal power is required by the electrical device, the electrical device can transmit the electrical signal to the power supply control unit for requesting the nominal power.

In step 102 the electrical signal from the electrical device is received by the power supply control unit and the power supply control unit controls the power mode of the power supply device depending on the received electrical signal. For example, after an electrical signal requesting nominal power has been received by the power supply control unit, the power supply control unit can control the power supply device such that the nominal power is supplied to the electrical device via the electrical conductor.

In step 103 the electrical device switches from the standby mode to the active mode. In particular, the electrical device can sense whether the nominal power is supplied, for instance, by detecting the supplied voltage and by comparing the detected voltage with a voltage threshold, and can switch from the standby mode to the active mode, if the nominal power has been detected. Alternatively or in addition, the electrical device can also be adapted to wait a predetermined waiting time of, for instance, 30 s and switch from the standby mode to the active mode, after the waiting time has been elapsed.

The electrical device can go back to the standby mode at any time and stop sensing the electrical signal, in particular, the heart beat signal. If the electrical device, which has stopped sending the electrical signal, is the last one, which has sent an electrical signal, or if the electrical device is the only load device, the power supply control unit can take a minimum time to sense that no electrical signal is received anymore and will step down to standby.

The above described DC power distribution system, which can be regarded as being a DC grid, provides a mechanism for making standby supply simple and highly efficient. Standby situations are system states where connected electrical devices consume power below a certain level of, for instance, 0.1 W per connected electrical device. In order to handle these standby situations, the DC power distribution system may comprise a second power supply of, for instance, 5 V, in order to power the standby low energy consuming connected electrical devices. The first power supply, which may be regarded as being a main power supply, can totally be switched off in this situation, in order to place a reduced voltage on the power rail.

The DC power distribution system provides preferentially a communication via two wires of the power rail, which are also used for supplying the DC power, in order to provide a technically relatively simple way of signaling for handling standby situations more efficiently. If an electrical device is switched off and goes to the standby mode only little power is needed. If all electrical devices, i.e. if all loads, only need standby power, the power supply device can switch to power save, for example, by switching on the low power supply, i.e. by switching on the second power supply, and by switching off the power hungry high power supply, i.e. by switching off the first power supply, which is designed to power all electrical devices when operated in full operational mode.

The electrical device can be adapted to be switched from a low power mode, in particular, a standby mode, to a high power mode, in particular, an active mode, and vice versa via manual or steered switching, wherein a switch may be connected to a microprocessor of the electrical device, which controls the same. The electrical device can also be switched in another way. For instance, the electrical device can comprise or can be connected to a sensor sensing, for example, the presence of a person, wherein, if a presence of a person is detected, the electrical device may be switched from a standby mode to an active mode and wherein, if a presence of a person is not detected anymore, the electrical device may be switched from the active mode to the standby mode.

In an embodiment each electrical device of the DC power distribution system may give a heart beat signal via their respective electrical device control units. In this way the power supply device may obtain an overview of current loads by means of listening to all electrical signals, which may be RF signals. In an embodiment the RF signals also reveal data on maximum power consumption, actual power required, timing, location, et cetera.

If a new electrical device is connected to the power rail, a new electrical signal, in particular, a new RF signal, may be added to the DC power distribution system. If the second power supply supplying the lower power is switched on and if the first power supply supplying the higher power is switched off, the power supply device can decide whether the first power supply should be switched on depending on the new electrical signal. For instance, if the new electrical signal indicates that the new electrical device is in a full operational mode or would like to enter it and is in wait for operational mode and not in a standby mode, the power supply device may decide to switch on a high power supply and to switch off a low power supply. The DC power distribution system can be regarded as being adapted to provide a power on request, wherein the high power supply may be switched on, if an electrical device transmits an electrical signal, which indicates that more power is consumed, which requires the high power supply to be activated.

Although in above described embodiments the power supply device comprises only two power supplies, i.e. the high power supply supplying preferentially a nominal voltage and the low power supply supplying preferentially a standby voltage, in other embodiments the power supply device can also comprise more than two power supplies supplying different DC voltages, wherein the power supply control unit can be adapted to control these power supplies depending on the operational states of the electrical devices of the DC power distribution system, i.e. depending on the operational states of the electrical loads of the DC power distribution system, in order to adapt the supplied power to the actual power consumption situation.

Although in above described embodiments the electrical devices are lamps, in other embodiments the electrical devices can also be other electrical loads like sensors, loudspeakers, et cetera. In particular, the DC power distribution system may comprise lamps and at least one presence sensor as the electrical devices, wherein the at least one present sensor can be adapted to send a signal for requesting higher power to the power supply control unit, if the at least one present sensor detects a presence of a person, wherein then the lamps can be switched from a standby mode to an active mode in which the higher power supplied by the power supply device is used. The switching of the lamps can also be initiated by the at least one presence sensor.

The signal may be indicative of only two operational modes, i.e. a standby mode and a full operational mode, or of more than two operational modes, wherein the power supply control unit can be adapted to control the power supply device depending on the respective actual operational mode of the one or several electrical devices of the DC power distribution system.

Although in FIGS. 1 and 2 only a single power bar is shown, the DC power distribution system can comprise two or more electrical conductors, in particular two or more power bars, which may receive power from one or more power supply devices.

Although in the above described embodiments certain kinds of signals for requesting higher power have been described, also other kinds of signals can be used for requesting a power change. For instance, the signal can be very simple such that it does not allow to distinguish between different electrical devices or to determine the number of electrical devices. However, the electrical signal can also be more complex, i.e., for example, it can be unique for the respective electrical device and optionally also carry additional information.

The signal can be a heartbeat signal, which is substantially continuously transmitted by an electrical device, as long as the electrical device requires the higher power, in particular, the nominal voltage. However, the electrical device could also be adapted to send a state change signal as the signal only, when switching from, for instance, a standby mode to an active mode or vice versa.

Although in the above described embodiments the signals are preferentially transmitted via the electrical conductor, in particular, via the power bar, in other embodiments the signal can also be transmitted in another way, for instance, wirelessly, optically, et cetera.

If the power supply device comprises a high power supply and a low power supply, in the high power mode only the high power supply may supply power and in the low power mode only the low power supply may supply power. However, the power supply device can also be adapted such that in the high power mode the high power supply and the low power supply supply their power and in the low power mode only the low power supply supplies power such that the low power supply may substantially always supply the lower power.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The control of the DC power distribution system in accordance with the DC power distribution method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a DC power distribution system for distributing DC power to one or several electrical devices. The system comprises an electrical device for receiving DC power via an electrical conductor from a power supply device with a power supply control unit and for transmitting a signal to the power supply control unit for requesting a lower power or a higher power. The power supply device is operable in a high power mode and in a low power mode, wherein the power supply control unit controls the power mode of the power supply device depending on the received signal. This allows adapting the power supply to the power, which is actually really needed in the DC power distribution system, in a technically relatively simple way. Particularly standby situations can be handled more efficiently.

The invention claimed is:

1. A direct current (DC) power distribution system for distributing DC power to one or more electrical devices, the DC power distribution system comprising:
  (i) an electrical conductor for conducting DC power from a power supply device to an electrical device,
    wherein the power supply device provides DC power to the one or more electrical devices using the electrical conductor and receives a signal from the one or more electrical devices for requesting a first amount of power or a second amount of power, wherein the first amount of power is greater than the second amount of power; and
  (ii) the power supply device for supplying DC power to the one or more electrical devices via the electrical conductor, wherein the power supply device is operable in a first power mode, in which the first amount of power is supplied to the one or more electrical devices via the electrical conductor, and in a second power mode, in which the second amount of power is supplied to the one or more electrical devices via the electrical conductor,
    wherein the power supply device comprises the power supply control unit the power supply control unit configured to receive the signal from the one or more electrical devices and control a power mode of the power supply device based on the signal from the one or more electrical devices,
    wherein the one or more electrical devices are configured to request the power supply device to supply the first amount of power by transmitting the signal to the power supply control unit,
    wherein the power supply control unit is configured to cause the power supply device to operate in:
      (1) the first power mode when the power supply control unit receives the signal, from the one or more electrical devices, for requesting the first amount of power, and
      (2) the second power mode when the power supply control unit does not receiving the signal for requesting the first amount of power within a predetermined receiving time interval.

2. The DC power distribution system of claim 1, wherein the power supply control unit is configured to transmit an electrical signal from the power supply control unit via the electrical conductor.

3. The DC power distribution system of claim 1, wherein the first amount of power is a nominal power amount associated with the DC power distribution system and the second amount of power is a standby power amount associated with the DC power distribution system.

4. The DC power distribution system of claim 1, wherein the one or more electrical devices are configured to provide the signal in response to the one or more electrical devices consuming less than a predetermined amount of power.

5. The DC power distribution system of claim 4, wherein the one or more electrical devices are configured to sense whether the first amount of power is supplied by the power supply device after the signal has been transmitted to the power supply control unit.

6. The DC power distribution system of claim 1, wherein the one or more electrical devices are configured to operate in a different power mode in response to sensing that the first amount of power is being supplied by the power supply device.

7. A power supply device for supplying direct current (DC) power to a DC power distribution system, wherein the power supply device is operable in a first power mode, in which a first amount of power is supplied to one or more electrical devices via an electrical conductor, and in a second power mode, in which a second amount of power, that is lower than the first amount of power, is supplied to the one or more electrical devices, the power supply device, comprising:
- a power supply control unit configured to:
  - (i) receive a signal from the one or more electrical devices;
  - (i) control the power mode of the power supply device based on the received signal, wherein the power supply control unit is configured to cause the power supply device to operate in the first power mode when the power supply control unit receives, from the one or more electrical devices, the signal requesting the first amount of power; and
  - (iii) when the power supply control unit does not receive the signal from the one or more electrical devices for a predetermined receiving time interval, causing the power supply device to operate in the second power mode.

8. A method for distributing DC power to one or several electrical devices, the method comprising:
- receiving, at a power supply control unit and via an electrical conductor, a signal from an electrical device, the signal based on a power consumption of the electrical device;
- causing a power mode of a power supply device to be a first power mode based on an electrical signal transmitted by the power supply control unit, wherein the power supply device supplies direct current (DC) power to the electrical device via the electrical conductor, and wherein the power supply device is operable in:
  - (i) the first power mode, in which a first amount of power is supplied to the electrical device via the electrical conductor, and
  - (ii) a second power mode, in which a second amount of power, that is lower than the first amount of power, is supplied to the electrical device via the electrical conductor;
- causing the power supply device to provide the first amount of power, via the electrical conductor, wherein the electrical device is configured to be responsive to the first amount of power; and
- when the power supply control unit does not receive the signal from the electrical device for a predetermined receiving time interval, causing the power supply device to operate in the second power mode.

9. The DC power distribution system of claim 1, wherein the one or more electrical devices include a lighting device and a sensor, the sensor configured to be responsive to a presence of a person proximate to the sensor.

10. The DC power distribution system of claim 1, wherein the power supply control unit is further configured to distinguish between the one or more electrical devices based on the signal received via the electrical conductor.

11. The DC power distribution system of claim 10, wherein an identity of an electrical device of the one or more electrical devices is embodied in the signal, and the electrical conductor is a power rail.

12. The DC power distribution system of claim 10, wherein the power supply control unit is further configured to distinguish between operational states of the one or more electrical devices based on the signal received via the electrical conductor.

13. The DC power distribution system of claim 10, wherein the power supply control unit comprises a filter selector having a filtering capacitor, and the power supply control unit distinguishes between the one or more electrical devices using at least the filter selector.

14. The power supply device of claim 7, wherein the signal identifies a location of the one or more electrical devices.

15. The power supply device of claim 7, wherein the electrical conductor is a power rail.

16. The method of claim 8, wherein an actual power requirement of the electrical device is embodied in the signal.

17. The method of claim 8, wherein the power supply device provides the first amount of power simultaneous to the signal being received from the electrical device.

18. The method of claim 17, wherein the electrical conductor is a power rail and the first amount of power is provided over the power rail.

19. The method of claim 8, wherein the electrical device is a lighting device that is in communication with a presence sensor for detecting the presence of a person in a room.

20. The method of claim 19, wherein an identity of the electrical device is embodied in the signal.

* * * * *